United States Patent [19]

Bode

[11] 3,983,795
[45] Oct. 5, 1976

[54] METHOD OF FORMING PHONOGRAPH RECORDS ON CARTON BLANKS

[75] Inventor: John T. Bode, Hartland, Wis.

[73] Assignee: Hoerner Waldorf Corporation, St. Paul, Minn.

[22] Filed: Apr. 21, 1975

[21] Appl. No.: 570,180

Related U.S. Application Data

[63] Continuation of Ser. No. 449,439, March 8, 1974, abandoned.

[52] U.S. Cl. .............................. 93/36 PC; 93/36 R; 264/107; 427/289
[51] Int. Cl.² ........................................ B31B 49/02
[58] Field of Search ............... 93/36 PC, 36 R, 36.6; 156/220; 427/289; 264/106, 107; 206/309

[56] References Cited
UNITED STATES PATENTS

| | | | |
|---|---|---|---|
| 2,020,381 | 11/1935 | Labowitz et al. | 206/309 X |
| 2,063,870 | 12/1936 | Finch | 264/107 X |
| 2,606,851 | 8/1952 | O'Mahony et al. | 264/107 X |
| 2,714,448 | 8/1955 | Brown | 206/309 X |
| 3,052,586 | 9/1962 | Brown | 264/107 X |
| 3,463,303 | 8/1969 | Gorman et al. | 206/309 X |

Primary Examiner—James F. Coan
Attorney, Agent, or Firm—Jerry F. Best

[57] ABSTRACT

An improvement in phonograph records, and method of making the same dealing particularly with a record formed in a coating applied to paperboard and normally used as a wall of a carton or the like.

4 Claims, 7 Drawing Figures

METHOD OF FORMING PHONOGRAPH RECORDS ON CARTON BLANKS

This is a continuation of application Ser. No. 449,439, filed Mar. 8, 1974, now abandoned.

BACKGROUND OF THE INVENTION

Several patents have been granted for the use of plastic materials which have been laminated to a paperboard base. For example, U.S. Pat. No. 3,265,396 issued Aug. 9, 1966 to H. Gorman discloses a phonograph record comprising a flat substrate which is normally formed of fibrous material such as paperboard and which is laminated to a surface layer of plastically deformable material. After the plastic sheeting has been laminated to the paperboard, the record impression is formed in the surface layer of the deformable material to provide thereon a recording receiving service. In order to strengthen the structure, the laminated area extends somewhat beyond the panel of paperboard and is secured to additional paperboard panels. Thus the recording comprises a central panel and a pair of additional paperboard panels hingedly connected along opposite edges so that the plastically deformable material extends not only over the central panel but over adjoining panels of paperboard which may be folded beneath the central panel to reinforce the same. The spindle receiving openings are provided at the center of the record impression as well as through the reinforcing panels so that the phonograph spindle may extend through all three panels.

U.S. Pat. No. 3,245,691 issued Apr. 12, 1966 to H. Gorman discloses a paperboard sheet of flexible fiberous material having laminated thereto a sound reproducing surface which may be impressed by a modulated spiral groove engagable by a stylus of the phonograph record playing device. In one form of the construction, the paperboard panel forms a closure for an open sided tray, and the plastic laminant extends over the edges of the panel bearing the impression so as to strengthen laminant. An aperture is formed in the center of the modulated spiral groove to accomodate a phonograph spindle.

In another form of the construction, the plastic film is laminated to the surface of an envelope and the edges of the deformable layer preferably extend above the edges of the envelope panel so as to reinforce the deformable layer when the record is placed upon a phonograph. A spindle aperture is provided at the center of the impression to accomodate a spindle of a phonograph.

U.S. Pat. No. 3,463,303 issued Aug. 26, 1969 to H. Gorman et al discloses a phonograph record including a substrate of paperboard having a thermoplastic coated substrate thereupon on which is impressed a sound recording surface. By removing the label from the cylindrical container, and flattening out the outer label, the phonograph record may be flattened sufficiently to play on a phonograph.

U.S. Pat. No. 3,469,849 issued Sept. 30, 1969 to H. Gorman discloses a phonograph record including a layer of paperboard or the like having laminated thereto a plastic film capable of receiving an impression such as a spiral record track. The paperboard may be die cut partially through the paperboard but not through the plastic record. This permits the record to be folded inwardly in a manner to enclose the surface bearing the sound surface bearing the sound track, the plastic film being sufficiently elastic to flex during the folding operation and yet to flatten out when unfolded without significant distortion of the record. The record and its supporting fibrous sheet may be either folded across the center, or folded along chords of the track so as to enclose the record when it is not being used.

U.S. Pat. No. 3,589,736 issued June 29, 1971 to Gorman discloses a synthetic resin container cover such as that used on coffee cans once the sealed cover end is removed. The circular cover may be impressed with a sound reproducing groove of a phonograph record, and reinforcing ribs may eminate from the center of the disc-like cover so that the full thickness of the cover may be placed upon a phonograph turntable while the recording is being played.

SUMMARY OF THE INVENTION

It has been found that considerable time and effort may be saved by coating the surface of the paperboard with a plastic-type coating in the area which is to be impressed with the spiral record groove. It has been found that through the use of a lithographic printing press a paperboard web may be fed through the press, the web passing through a series of printing stages equiped with drying areas to dry the ink upon the paperboard before the next color is applied. As many as four or five colors may be printed upon the paperboard, the ink normally impregnating the paperboard so that the thickness of the board is increased but a very small extent. After the printing operation, the paperboard web may pass through as many as three or more coating stages, each of which applied a coating capable of being impressed in the manner of a phonograph record. These coating operations normally print a circular pattern of coating onto the panel, each coating overlying the other. The web may then be directed in the usual manner to a die cutting press which forms the various panels of a carton or the like, leaving small areas of the cartons connected so that they may be readily disengaged by hand or by suitable stripping means. It is also possible to incorporate it in one portion of the die a heated insert which will impress the spiral groove into the coating and also to form or partially form the aperture for receiving the spindle of a phonograph. As a result, the completed cartons or other products may be formed in a continuous operation, thus eliminating the previous step of laminating the plastic film to the paperboard.

This is but one form of producing the record. The process may be accomplished on a roll coater or gravure press rather than an offset press. The method described is for the purpose of illustration, and shows one means by which the process may be accomplished.

An advantage of the present construction lies in the fact that the application of layers of coating to the cartons or other objects being formed does not interfere in any way with the printing of the cartons. In view of the fact that the coatings used are normally transparent, the surface of the carton or other objects thus formed appears the same whether the record has been applied thereto or whether it has not. In other words, the coating may be added to paperboard panels which have been completely printed and the spiral recording will not in any way interfere with the appearance of the cartons during shipment and storage.

These and other objects and novel features of the present invention will be more clearly and fully set forth in the following specification and claims.

BRIEF DESCRIPTION OF THE DRAWINGS

FIG. 2 also indicates diagrammatically the die cutting section including the fixed platen and a vertically movable platen between which the web is fed, the formed cartons being fed onto a conveyor from which they are manually separated and stacked on pallets or the like prior to the gluing of the manufacturers joint.

DESCRIPTION OF THE PREFERRED EMBODIMENT

Figure 7:
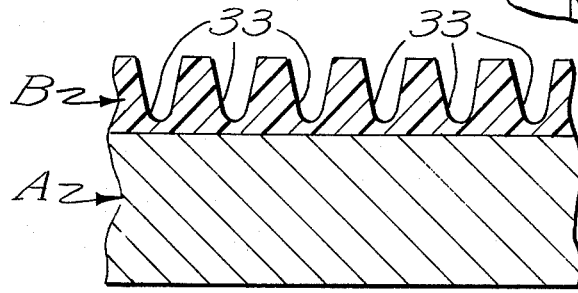
FIG. 7 is a greatly enlarged view showing the manner in which the spiral sound producing track is impressed into the coating which overlies the paperboard backing.
Figure 1:
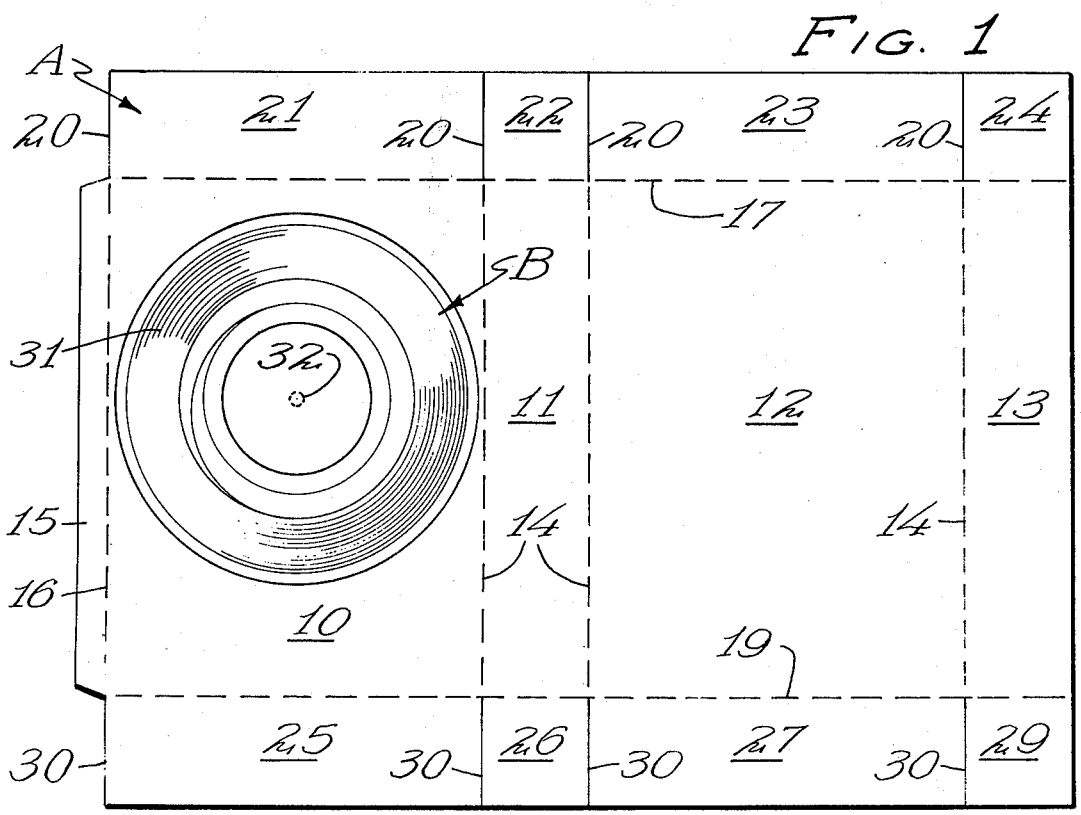
FIG. 1 illustrates diagrammatically a flat blank from which a carton of common form is produced, showing the coating and the impressed spiral groove formed on one panel thereof.

In view of the fact that lithograph presses are well known in the art, little description is required. In the particular arrangement illustrated, paperboard cartons are being formed, each bearing the impression of a phonograph record on one panel. Obviously, the number of cartons which may be produced at one time depends almost completely upon the size of the carton, and being necessary that the cartons be of proper size to be printed by the printing rollers and to be die cut by the die cutting mechanism. In FIG. 1, the carton A includes rectangular panels 10, 11, 12 and 13 which are foldably connected on parallel fold lines indicated generally by the numeral 14. A glue flap 15 is preferably connected to one end panel of the series along a fold line 16. The carton A also includes a pair of parallel fold lines 17 and 19 which define the limits of the panels 10, 11, 12 and 13. The area above the fold line 17 is divided by cut lines 20 which are aligned with the fold lines 14 and 16 into closure panels 21, 22, 23 and 24. In a similar manner, the fold line 19 forms a line of connection between the main panels and bottom closure flaps 25, 26, 27 and 29, the closure flaps being separated by cut lines 30 which are alined with the fold lines 14 and 16. The letter B designates the circular area which is coated with a sufficient number of layers of coating to act effectively as the base for the spiral lines 31 which act as the sound track for the movable stylus of a phonograph. An aperture 32 is either partially cut or entirely cut from the panel 10 at the center of the disc B this aperture serving to accommodate the phonograph spindle. In other words, FIG. 1 illustrates merely a carton of conventional form bearing layers of coating which are preferably circular in form and which may be impressed to produce a sound record having grooves such as 33, visible in FIG. 7, arranged spirally as is usual practice. In actual practice, the grooves 33 are of a width less than the thickness of human hair.

Figure 2:
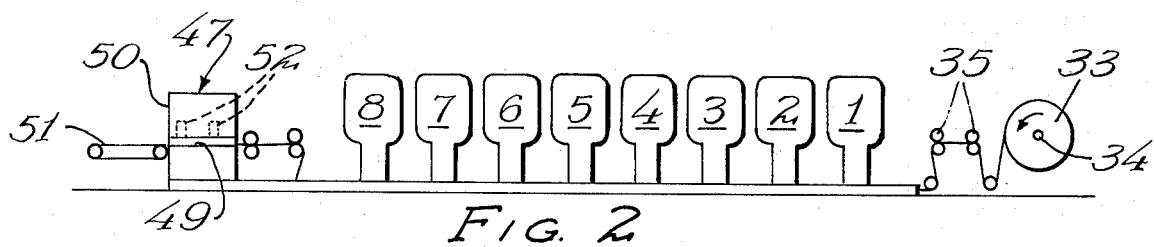
FIG. 2 is a diagrammatic view showing a modern lithographing press, indicating diagrammatically the roll from which the paperboard web is removed, and showing a series of heated stations through which the paperboard may pass during the printing and coating operation.

FIG. 2 of the drawings discloses a roll of paperboard 32 supported on a suitable supporting shaft 34, and which pass through or over a series of rollers 35 designed to flatten out the sheet. The stations are indicated by the numerals 1 to 8, 8 such stations not being unusual in a lithographing press. The first five stations may be used to apply predetermined colors to the web while the remaining stations 6, 7 and 8 may be used for various purposes. For example, these stations may be used for applying a covering coating having a plastic base or may be used to apply lacquer or the like to provide the desired sheen upon the board. In the present instance, the stations 6, 7, and 8 are used to apply a coating material in a specific area of the board, as, for example, to form the circular discs B. The number of layers of coating which is applied depends upon the nature of the coating, the ability of the coating to dry rapidly, and the thickness of coating desired to produce the desired sound reproduction.

Figure 3:
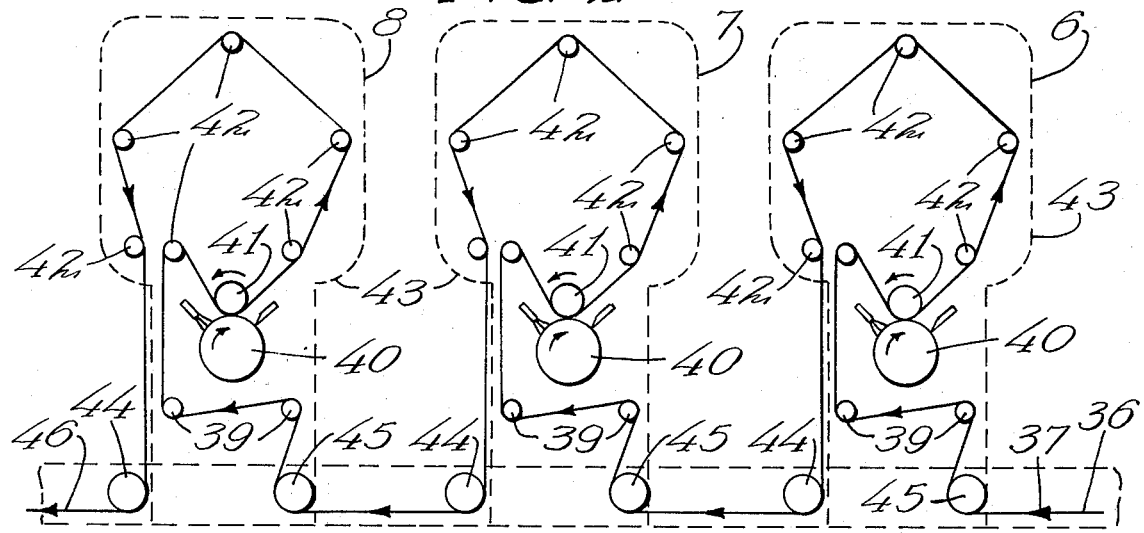
FIG. 3 is an enlarged diagrammatic view showing three of the sections being generally similar in form, and being capable of applying a color or a layer of coating to a web as it passes through each stage.

As indicated in FIG. 3, the web 36 travels in the direction of the arrows such as 37 and passes over a series of idle rollers such as 39 and between an impression roller 40 and a suitable back-up roller 41. After passing between the rollers 40 and 41, the web travels over spaced rollers such as 42 located in the enclosed upper portion of each section indicated by the numeral 43. The upper portion 43 is normally heated to a desirable temperature at which the coating will solidify. After passing the final roller 42, the sheet extends downwardly over horizontally spaced rollers 44 and 45 and into the adjoining section 7. In view of the fact that the sections are of identical form, the various rollers will be given similar identification numerals.

It will be understood that in the lithographing operation, it is possible that only 2, 3 or 4 colors be printed. This is accomplished by merely extending the web transversely from one roller 45 to the next roller 44, eliminating the travel of the paperboard through the stations which are not being used. From the final stage 8, the web travels in the direction of the arrow 46 to the die cutting apparatus which is indicated in general by the numeral 47. It will be understood that the web is held stationary while being die cut between the fixed platen 49 and the movable platen 50 so that a loose loop of paperboard usually follows the last section, the slack in the web being intermittently taken up by suitable web moving apparatus which moves the web temporarily at a speed above its normal speed so that it may remain stationary during the cutting operation.

Figure 6:
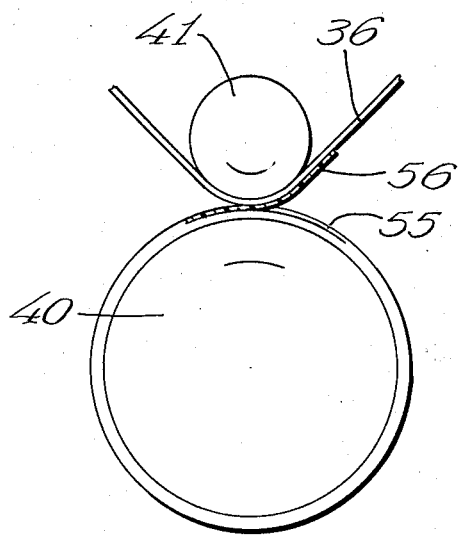
FIG. 6 is a diagrammatic view showing the manner in which a coating may be applied to the web as it passes between the adjoining rollers.
Figure 5:
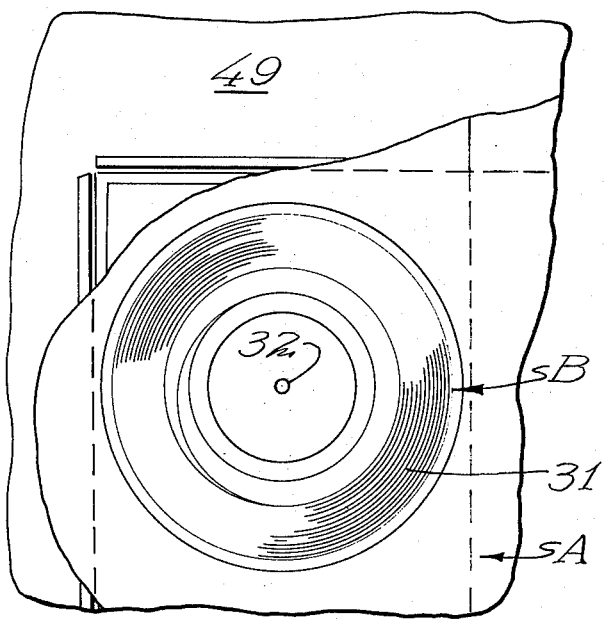
FIG. 5 indicates a small portion of the fixed or female die showing a portion of a carton being die cut and including the panel on which the record impression has been formed.
Figure 4:
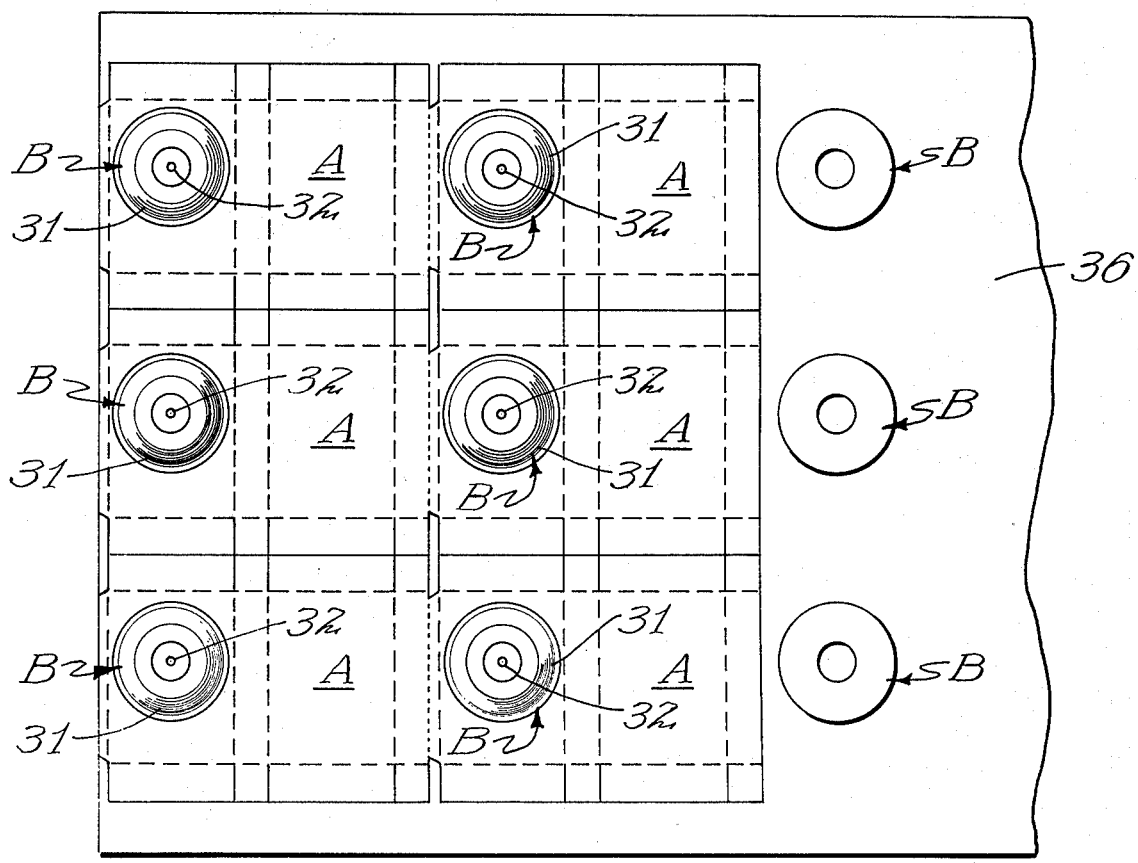
FIG. 4 is a diagrammatic view of the web at the completion of the die cutting operation, the view illustrating six completed cartons being simultaneously die cut and showing on the right side of the completed cartons a portion of the web in position to enter the die cutting stage.

In the die cutting apparatus 47, the cutting and creasing dies are arranged so that the various cartons A such as those shown in FIG. 4 usually do not completely separate the cartons, thereby being nicked in the cutting rolls so as the die cut sheets move on to the conveyor 51 they may be readily separated manually and stacked in piles upon suitable pallets which are not illustrated in the drawings. Obviously, a single layer of coating may be sufficient to produce the record of proper tone. As is indicated in FIG. 2 of the drawings, heated dies such as 52 may be incorporated in the upper movable dies, and these heated dies 52 may be used to indicate diagrammatically how the coating may be applied to the web 36. As can be seen in FIG. 6, a depression 55 which is greatly exaggerated in size may contain a proper thickness of coating which is transferred to the web 36 as indicated by the numeral 56. Quite obviously, the thickness of coating indicated at 56 is greatly exaggerated, and is shown merely for the purpose of illustration.

Coatings which have been found acceptable for use to provide sound records include coatings of Polyacrylate homopolymers, styrene homopolymers, and thermo-plastic "Polyester" plymers. Films which have been successfully used include a styrene such as methyl methacrylate copolymer in solvents, and a polyethelene such as acrylate copolymer solution.

In accordance with the Patent Statutes, I have described the principles of construction and operation of my PHONOGRAPH RECORDS AND METHOD OF COATING THE SAME, and while I have endeavored to set forth the best embodiment thereof, I desire to have it known that obvious changes may be made within the scope of the following claims without departing from the spirit of my invention.

I claim:

1. The method of forming carton blanks, said blanks adapted to be erected into cartons having a least one panel formed with a phonograph record as an integral part thereof, said method comprising the steps of:

passing a web of paperboard or similar material through printing apparatus and applying at least one coating of said panel of a liquid solution adapted to become a layer of thermo-plastic polymer material;

moving said coated web into a die cuting apparatus; and die cutting said web into carton blanks and engaging said coated areas of said web with dies suitable for pressing sound recording grooves into said coating.

2. The method of claim 1, wherein said application of said coating is carried out on a gravure-style printing press.

3. The method of claim 1, wherein said application of said coating is carried out on a lithographic press.

4. The method of claim 1, wherein said die cutting and said pressing are carried out simultaneously with one another.

* * * * *